Patented Nov. 11, 1952

2,617,813

UNITED STATES PATENT OFFICE 2,617,813

POLYAMIDES

Anderson W. Ralston and Robert J. Vander Wal, Chicago, and James Harwood, Western Springs, Ill., assignors to Armour and Company, Chicago, Ill., a corporation of Illinois No Drawing. Application May 13, 1944, Serial No. 535,562

9 Claims. (Cl. 260—404.5)

This invention is concerned with condensation products prepared from the polymerized amines and polymerized aliphatic carboxylic acids and deals more specifically with the preparation of compositions by the condensation of polymerized unsaturated aliphatic amines with polymerized unsaturated fatty acids.

It is well known that certain condensation products possess the property of elasticity while others show little or no evidence of this property. For many uses it is quite desirable and for other uses it is very essential that condensation products possess a rather high degree of elasticity. For example, materials used for coating paper and materials used for coating metal products such as cans, and for coating textile fibers and similar products, should be sufficiently elastic that the coated substance can be bent, folded or otherwise distorted in shape without causing the coating material to crack or lose its adherence to the solid surface.

We have discovered that valuable condensation products possessing flexibility can be prepared from unsaturated fatty acids by the following sequence of reactions:

The unsaturated fatty acids or mixtures of unsaturated fatty acids are converted to nitriles by the action of ammonia at elevated temperatures. This can be accomplished without a significant loss in unsaturation and results in a mixture of unsaturated nitriles of the same chain length as the starting material. These unsaturated nitriles are then polymerized by heating them at an elevated temperature in an inert atmosphere. The polymerization takes place at the olefinic bonds and probably results in the formation of dimers. The polymerized nitriles so formed contain at least two nitrile groups in each molecule and generally possess one or more olefinic bonds. The polymerization should be stopped before the unsaturation is substantially lost. These unsaturated polymerized nitriles are hydrogenated to amines by a process of catalytic hydrogenation. This hydrogenation is conducted in such a manner that the nitrile groups are quantitatively converted to amino groups without significant hydrogenation of the olefinic bonds. The resulting products are therefore polymerized amines and each molecule contains two or more amino groups. These polymerized amines are then condensed with previously polymerized fatty acids. The polymerized acids are prepared by heating fatty acids, their glycerides, or alkyl esters, in an inert atmosphere for a number of hours. The unpolymerized portion may be removed by vacuum distillation. The product of the condensation of the polymerized amines and polymerized acids will vary from a thick non-sticky liquid which flows easily at elevated temperatures at the order of 75° C. to a tough, elastic solid depending upon the time of heating. We heat the mixture for from 4 to 8 hours but greater or lesser heating periods may be used if extremely viscous or very thin products are desired. The solid condensate can be stretched without rupture and when released it returns substantially to its original size, showing that it possesses the property of elasticity.

This product can be milled with carbon black or other fillers and when the product is vulcanized with sulphur it gives an elastic product having many properties of vulcanized rubber. The unvulcanized product can be mixed with other materials such as high molecular weight amides or ketones and this mixture has been found to be a superior coating for paper, fabrics or other materials where a high degree of water and grease resistance is desirable. We have also found that the material itself is useful as a coating for paper, fabrics and other materials.

Our improved products come as a direct result of the reaction between the polyamines and the polyacids and any method of obtaining these reactants may, of course, be employed. We prefer to form the polyamine from natural fatty acids which may be obtained through the hydrolysis of natural fats and oils. We prefer to use those materials having high proportions of fatty acid radicals of two or more double bonds. For example, we may use soya bean oil fatty acids or linseed oil fatty acids or fish oil fatty acids, each of these sources having higher proportions of polyenic acid radicals. Advantageously, we can subject the natural fatty acid mixtures to fractionation as by fractionally crystallizing them to prepare a material having a still higher proportion of polyenic acids than the original mixtures. The acids so obtained may then be reacted as previously described to prepare the polyamines. While it is important that a substantially large proportion of the acids used in the preparation of the amines contains two or more double bonds, the mixture used may contain acids of one double bond and even saturated acids. However, it is essential that the polyamines contain long carbon chains having at least 18 carbon atoms, and our improved products cannot be prepared using the short chain amines like hexamethylene diamine or ethylene diamine. Such amines, when polymerized and reacted with the polyacids, will yield brittle products of questionable value and quite distinct from the products of our invention. The characteristic long carbon chain structure is obtained when fatty acids of 18 or more carbon atoms are used in the reactions to prepare the amines.

In the preparation of the polyacid we prefer to use fatty acids obtained from natural oil sources such as soybean oil, linseed oil, fish oil and the like, it being desirable to use acid mixtures having a high proportion of polyenic acids. As in the case of the amines, it is advantageous to fractionally crystallize the natural acid mixture to obtain a fraction having a higher proportion of polyenic acids than is contained in the natural mixture. As in the case of the amines, we find that the polyacids should have long carbon chains of at least 18 carbons and that the shorter chain polybasic acids such as adipic, sebacic or maleic acids yield inferior compositions unlike the improved products of our invention.

Following are specific examples of the preparation of condensation products by the practice of our invention:

Example 1

860 grams of the mixed acids of soya bean oil are converted to the corresponding nitriles by treatment with ammonia at elevated temperatures. The yield of nitrile is 688 grams. This is placed in a 2 liter round bottomed flask and is heated for 24 hours at 300° C. in an atmosphere of nitrogen. After cooling, the product is a dark reddish liquid with a viscosity of Y (Gardner) at room temperature. The polymerized nitriles are placed in a glass still and distilled to a pressure of 0.35 mm. The product is distilled until the temperature of the distillate is 152° at 0.35 mm. The distillate amounts to 268 grams and the residue 371 grams. The residue consists essentially of polymerized nitriles. Most of the polymers probably exist as dimers. The distillate which consists of unpolymerized nitriles is discarded.

A portion of the above product, 160 grams, is mixed with 3.3 grams of a nickel catalyst and 3.2 cc. of 5% sodium hydroxide solution. The mixture is placed in a steel autoclave and hydrogenated at a pressure of 320 pounds per square inch and a temperature of 140° C. for 2 hours. The product is a reddish brown liquid and consists essentially of unsaturated dimerized amines.

Polymerized unsaturated acids are obtained as follows:

250 grams of the methyl esters of soya bean fatty acids are placed in a 500 cc. round bottomed flask equipped with an air condenser. The esters are heated in an atmosphere of nitrogen for 25 hours at 290 to 300° C. The product is a reddish oil. This product is subjected to distillation and the unpolymerized esters removed. The distillation is continued until the temperature of the residue reaches 240° C. at 1 mm. The residue weighs 127 grams and is a clear reddish viscous oil. This is saponified with alcoholic potassium hydroxide and the resulting soap acidified with hydrochloric acid. The resulting polymerized acids are a clear reddish brown oily viscous liquid. The acid value is 180 and the apparent molecular weight 686, assuming the product to be a dimer.

A mixture is made which contains 281 grams of the unsaturated polymerized amine above described and 250 grams of the polymerized acid. This mixture is placed in a glass vessel which is immersed in an oil bath. It is then heated at a temperature of 150 to 160° C. with stirring for 6 hours in an atmosphere of nitrogen. The mixture which is originally fluid gradually thickens during this heating period. The final product is a non-sticky elastic mass. It may be mixed with gas black, sulphur, zinc oxide and an accelerator and then milled and vulcanized at 130 to 160° C. The final product has the appearance and many of the properties of vulcanized rubber.

This final product may be mixed with equal parts of stearonitrile and stearone and palmitone or other high molecular weight aliphatic ketones and the resulting mixture used for coating paper. In this process a material may be used in the molten state if desired since a solvent is not necessary. A solvent may, however, be employed to thin the mixture if so desired.

Example 2

A polymerized amine is prepared, according to the procedure described in the foregoing example, from the mixed acids obtained by hydrolysis of cottonseed oil.

Polymerized soya bean fatty acids are prepared by thermal polymerization of the glyceride followed by saponification and acidification. The unpolymerized acids are then removed by vacuum distillation.

A mixture of 295 grams of this polymerized amine and 250 grams of the polymerized acid is then prepared. This is heated for hours in an oil bath at a temperature of from 150 to 160° C. and is stirred continuously during the heating period. An atmosphere of carbon-dioxide is maintained above the reacting mass during the heating period. The product is a highly viscous mass which flows very slowly, possesses elasticity as indicated by the fact that when stretched it can return substantially to its original shape.

We have found that our best products are obtained when the reaction between the polymerized amine and the polymerized acid is as nearly complete as possible. In many instances, however, we desire to carry our condensation only part way and finish it at a later stage. This is frequently done where the product is used as a paper coating.

Since the polymerized amine is basic and the polymerized acid acidic we believe that the materials should be added in essentially equal molecular portions. Since it is quite desirable in many instances that the final product be neither acidic nor basic, small amounts of basic or acidic substances may be added to the final product without materially changing its properties.

It is understood that the foregoing detailed description and the specific examples given are for the purpose of explanation only and that our improvements may be practiced in widely differing forms, all within the spirit of the invention.

What we claim, and desire to secure in Letters Patent is:

1. The condensation product of a polymerized unsaturated carboxylic acid containing a polyenic carbon chain of 18 carbons and a polymerized unsaturated amine containing a polyenic aliphatic radical having 18 carbon atoms.

2. A polyamide obtained by reacting a polymeric fat acid with polyoctadecapolyenylamine at a temperature within the range of 150° C. to 250° C. for a period of several hours.

3. A polyamide obtained by reacting a polymeric fat acid with dioctadecapolyenylamine at a temperature within the range of 150° C. to 250° C. for a period of several hours.

4. A polyamide obtained by reacting a polymeric fat acid with polyoctadecapolyenylamine at a temperature at least as high as 150° C. for a period of several hours.

5. The condensation product of a polymerized unsaturated carboxylic acid containing a polyenic carbon chain of at least 18 carbons and a polymerized unsaturated amine containing a polyenic aliphatic radical having at least 18 carbon atoms.

6. A process for the preparation of an elastic composition comprising heating a polymerized unsaturated carboxylic acid containing a polyenic carbon chain of at least 18 carbons with a polymerized unsaturated amine containing a polyenic aliphatic radical having at least 18 carbon atoms, until the reaction product is formed.

7. A process as set forth in claim 6 wherein said carboxylic acid is a soybean oil fatty acid.

8. A process as set forth in claim 6 wherein said carboxylic acid is a linseed oil fatty acid.

9. A process as set forth in claim 6 wherein said carboxylic acid is a fish oil fatty acid.

ANDERSON W. RALSTON.
ROBERT J. VANDER WAL.
JAMES HARWOOD.

REFERENCES CITED

The following references are of record in the file of this patent:

UNITED STATES PATENTS

| Number | Name | Date |
|---|---|---|
| 2,071,250 | Carothers | Feb. 16, 1937 |
| 2,130,523 | Carothers | Sept. 20, 1938 |
| 2,146,210 | Graves | Feb. 7, 1939 |
| 2,177,619 | Nicodemus et al. | Oct. 24, 1939 |
| 2,246,842 | De Groote | June 24, 1941 |
| 2,247,353 | Auer | July 1, 1941 |
| 2,374,137 | Salisbury | Apr. 17, 1945 |
| 2,379,413 | Bradley | July 3, 1945 |
| 2,435,478 | Teeter et al. | Feb. 3, 1948 |
| 2,450,940 | Cowan et al. | Oct. 12, 1948 |